(12) United States Patent
Batchelder et al.

(10) Patent No.: US 10,675,858 B2
(45) Date of Patent: Jun. 9, 2020

(54) ELECTROPHOTOGRAPHY-BASED ADDITIVE MANUFACTURING WITH SUPPORT STRUCTURE AND BOUNDARY

(71) Applicant: Evolve Additive Solutions, Inc., Minnetonka, MN (US)

(72) Inventors: J. Samuel Batchelder, Somers, NY (US); S. Scott Crump, Wayzata, MN (US)

(73) Assignee: Evolve Additive Solutons, Inc., Minnetonka, MN (US)

( * ) Notice: Subject to any disclaimer, the term of this patent is extended or adjusted under 35 U.S.C. 154(b) by 514 days.

(21) Appl. No.: 15/380,668

(22) Filed: Dec. 15, 2016

(65) Prior Publication Data

US 2017/0173874 A1    Jun. 22, 2017

Related U.S. Application Data

(60) Provisional application No. 62/269,563, filed on Dec. 18, 2015.

(51) Int. Cl.
*B33Y 80/00* (2015.01)
*B33Y 10/00* (2015.01)
(Continued)

(52) U.S. Cl.
CPC ............ *B33Y 80/00* (2014.12); *B29C 64/141* (2017.08); *B29C 64/40* (2017.08); *B33Y 10/00* (2014.12);
(Continued)

(58) Field of Classification Search
CPC ..................................................... B33Y 80/00
See application file for complete search history.

(56) References Cited

U.S. PATENT DOCUMENTS

| 8,123,999 B2 | 2/2012 | Priedeman, Jr. et al. |
| 8,246,888 B2 | 8/2012 | Hopkins |

(Continued)

FOREIGN PATENT DOCUMENTS

| WO | 2016013198 A1 | 1/2016 |
| WO | 2016084348 A1 | 6/2016 |

(Continued)

*Primary Examiner* — Larry W Thrower
(74) *Attorney, Agent, or Firm* — Pauly, DeVries, Smith & Deffner LLC

(57) ABSTRACT

A method of printing a part in an additive manufacturing system includes printing a support structure for the part, printing a boundary surrounding the support structure, and printing the part on the support structure. An additive manufacturing system for printing a three-dimensional part includes a transfer medium configured to receive and transfer imaged layers of a thermoplastic-based powder for a boundary, a thermoplastic-based powder for a support, and a thermoplastic-based powder for the part from at least two imaging engines, a heater configured to heat the imaged layers on the transfer medium to at least a fusion temperature of the thermoplastic-based powder, and a layer transfusion assembly including a build platform, the layer transfusion assembly being configured to transfuse the heated layers in a layer-by-layer manner onto the build platform to print the three-dimensional part.

13 Claims, 9 Drawing Sheets

(51) Int. Cl.
  *B29C 64/40* (2017.01)
  *G03G 15/24* (2006.01)
  *G03G 15/16* (2006.01)
  *G03G 15/22* (2006.01)
  *B29C 64/141* (2017.01)

(52) U.S. Cl.
  CPC ....... *G03G 15/1625* (2013.01); *G03G 15/224* (2013.01); *G03G 15/24* (2013.01); *G03G 2215/1695* (2013.01)

(56) References Cited

U.S. PATENT DOCUMENTS

| | | |
|---|---|---|
| 8,459,280 B2 | 6/2013 | Swanson et al. |
| 8,488,994 B2 | 7/2013 | Hanson et al. |
| 8,879,957 B2 | 11/2014 | Hanson et al. |
| 9,029,058 B2 | 5/2015 | Martin |
| 2008/0169585 A1 | 7/2008 | Zinniel |
| 2011/0186081 A1 | 8/2011 | Dunn et al. |
| 2013/0186549 A1 | 7/2013 | Comb et al. |
| 2013/0186558 A1 | 7/2013 | Comb et al. |
| 2015/0024309 A1* | 1/2015 | Martin .................. G03G 5/071 430/48 |

FOREIGN PATENT DOCUMENTS

| | | |
|---|---|---|
| WO | 2016084350 A1 | 6/2016 |
| WO | 2016084351 A1 | 6/2016 |

* cited by examiner

ELECTROPHOTOGRAPHY-BASED ADDITIVE MANUFACTURING WITH SUPPORT STRUCTURE AND BOUNDARY

CROSS REFERENCE TO RELATED APPLICATION(S)

The present application claims the benefit of U.S. Provisional Patent Application Ser. No. 62/269,563 entitled ELECTROPHOTOGRAPHY-BASED ADDITIVE MANUFACTURING WITH SUPPORT STRUCTURE AND BOUNDARY which was filed on Dec. 18, 2015, the contents of which are incorporated by reference in its entirety.

BACKGROUND

The present disclosure relates to additive manufacturing systems for printing three-dimensional (3D) parts and support structures. In particular, the present disclosure relates to printing 3D parts and sacrificial support structures using an imaging process, such as electrophotography.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In an electrophotographic 3D printing process, each slice of the digital representation of the 3D part and its support structure is printed or developed using an electrophotographic engine. The electrophotographic engine generally operates in accordance with 2D electrophotographic printing processes, using charged powder materials that are formulated for use in building a 3D part (e.g., a polymeric toner material). The electrophotographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and/or pressure to build the 3D part.

In two-dimensional (2D) printing, electrophotography (i.e., xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where toner is applied to charged areas, or alternatively to discharged areas of the photoconductive insulator to form visible images. The formed toner images are then transferred to substrates (e.g., printing paper) and affixed to the substrates with heat and/or pressure.

SUMMARY

An aspect of the present disclosure is directed to a method of printing a part in an electro-photography based additive manufacturing system. The method includes printing a part and a support structure for the part in a layer by layer manner, and providing a boundary surrounding the support structure. The boundary is of sufficient strength to resist deformation of the support structure during printing of a layer of the part.

In some aspects the boundary is printed with the part and the support. In some aspects, the boundary is provided as a boundary structure on a movable build platform, the boundary structure having walls surrounding a movable platen carried on the movable build platform, wherein a position of the movable platen within the boundary structure is controllably adjustable on the movable build platform.

Another aspect of the present disclosure is directed to a method for printing a part from part material, and a support structure from support material, with an electrophotography-based additive manufacturing system. The method includes providing a boundary of sufficient strength to constrain lateral expansion of the support material during transfusion of the part material, developing a first portion of a layer with the support structure from charged support material with a first electrophotography engine, developing a second portion of the layer with charged part material with a second electrophotography engine, electrostatically attracting the developed layers from the electrophotography engine to a transfer medium, and moving the attracted layers to a layer transfusion assembly with the transfer medium. The method includes transfusing the moved layers to previously-printed layers of the part and support structure with the layer transfusion assembly under pressure at an elevated temperature in one embodiment.

In some aspects, providing the boundary comprises developing a third portion of a layer of the boundary from charged part material with the second electrophotography engine, wherein the boundary is printed with the part and support. In some aspects, the boundary is provided as a boundary structure on a movable build platform, the boundary structure having walls surrounding a movable platen carried on the movable build platform, wherein the movable platen is movable within the boundary structure on the movable build platform.

In some aspects the boundary is printed with part material, or with a material different than the part material, or with a combination of part material and support material which may be soluble. The boundary is of sufficient strength to resist deformation of the support structure during a transfusion process that transfers the layer of materials to a previously-printed layer of the part with the use of heat and pressure. Printing of the support structure, boundary, and part is performed in one or more embodiments using at least two electrophotography engines.

Another aspect of the present disclosure is directed to an electrostatically printed three-dimensional block part including a printed part, a removable support surrounding the printed part, and a boundary surrounding the removable support, the boundary having a strength greater than the support. In one aspect, the part and the support material maintain a desired configuration after pressure transfusion in a three-dimensional printing process. In one aspect, the boundary constrains the support against lateral expansion during transfusion of layers of the part and support. In another aspect, the boundary further includes a buttress to further constrain the support against lateral expansion.

Another aspect of the present disclosure is directed to a method of printing a part in an electrophotography-based additive manufacturing system, including printing a support structure for the part, and printing the part on the support structure, wherein printing the support structure and the part comprises printing to a movable platen carried on a movable build platform, the movable platen movable within a boundary structure on the movable build platform, wherein the boundary resists deformation of the support structure during printing of a layer of the part.

In some embodiments the at least two imaging engines include a first imaging engine for printing layers of a part material and a boundary material, and a second imaging engine for printing layers of the support material. The first and second imaging engines print different materials in one embodiment. In other embodiments, the at least two imaging engines include three imaging engines, an imaging engine for each of the part, support structure, and boundary, each printing different materials.

Definitions

Unless otherwise specified, the following terms as used herein have the meanings provided below:

The term "copolymer" refers to a polymer having two or more monomer species, and includes terpolymers (i.e., copolymers having three monomer species).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" styrene-butyl acrylate-methacrylic acid copolymer is interpreted to include one or more polymer molecules of the copolymer, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one copolymer", "one or more copolymers", and "copolymer(s)" may be used interchangeably and have the same meaning.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
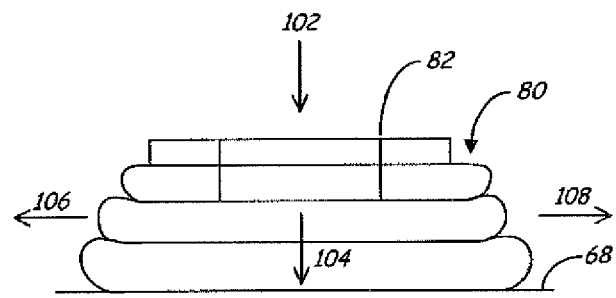
FIG. 1 is a side view of a part and support structure built according to the prior art.

Embodiments of the disclosure are described more fully hereinafter with reference to the accompanying drawings. Elements that are identified using the same or similar reference characters refer to the same or similar elements. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, the present disclosure may be embodied as methods, systems, devices, and/or computer program products, for example. Accordingly, the present disclosure may take the form of an entirely hardware embodiment, an entirely software embodiment or an embodiment combining software and hardware aspects. The computer program or software aspect of the present disclosure may comprise computer readable instructions or code stored in a computer readable medium or memory. Execution of the program instructions by one or more processors (e.g., central processing unit), such as one or more processors of a controller, results in the one or more processors performing one or more functions or method steps described herein. Any suitable patent subject matter eligible computer-readable media or memory may be utilized including, for example, hard disks, CD-ROMs, optical storage devices, or magnetic storage devices. Such computer-readable media or memory do not include transitory waves or signals.

The computer-readable medium or memory mentioned herein, may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As mentioned above, during an electrophotographic 3D part additive manufacturing or printing operation, electrophotographic (EP) engines develop each layer of a 3D part out of charged particle materials (e.g., polymeric toners) using the electrophotographic process. A completed layer of the 3D part typically includes a part portion formed of part material by one EP engine that is transferred to a suitable transfer medium, such as a transfer belt or drum, and a support structure portion formed of support material by a different EP engine that is applied to the transfer medium in registration with the corresponding part portion. Alternatively, the part portion may be developed and transferred to the transfer medium in registration with a previously printed support structure portion on the transfer medium. The completed layers of the 3D part are delivered to a transfusion assembly using the transfer medium where the layers are transfused together (e.g., using heat and/or pressure) in an overlaying manner to build the 3D part and support structures in a layer-by-layer manner. The support structures are later dissolved or disintegrated in an aqueous solution or dispersion to reveal the completed 3D part.

The accuracy at which a 3D part may be produced using an electrophotography-based additive manufacturing system is limited by registration errors between the EP engines, and overlay errors at the transfusion assembly. Registration errors relate to the accuracy at which the layers of materials are printed relative to each other on the transfer medium by the EP engines. Overlay errors relate to the accuracy at which a printed layer is transfused to a layer of the currently formed 3D part and support structure in proper alignment. Registration and overlay errors can prevent the part and support materials from being printed at precisely the correct locations or within a margin of error in the x-y build plane, which can reduce printing accuracies, particularly for fine-feature details. Additionally, in some situations, these errors can result in the formation of overhanging ridges in the 3D part, which can grow along the z-axis to impair part accuracies and even impact the system performance if left uncorrected. Additionally, edge positioning errors can induce crack-like surface features which substantially reduce the effective bulk strength of the fabricated parts.

The present disclosure is directed to a method for printing a part with a sacrificial support material, that can be a water soluble material, that is supported against back pressure and deformation during printing of a part material in a transfusion process. During a printing operation, electrophotography (EP) engines may develop or otherwise image each layer of the part and support materials using the electrophotographic process. The developed layers are then transferred to a layer transfusion assembly where they are transfused (e.g., using heat and/or pressure) to print one or more 3D parts and support structures in a layer-by-layer manner.

In comparison to 2D printing, in which developed toner particles can be electrostatically transferred to printing paper by placing an electrical potential through the printing paper, the multiple printed layers in a 3D environment effectively prevents the electrostatic transfer of part and support materials after a given number of layers are printed (e.g., about 15 layers). Instead, each layer may be heated to an elevated transfer temperature, and then pressed against a previously-printed layer (or to a build platform) to transfuse the layers together in a transfusion step. This allows numerous layers of 3D parts and support structures to be built vertically, beyond what is otherwise achievable via electrostatic transfers.

During the transfer of a new layer to a previously-printed layer, the pressure applied to effect the transfer of part material may be high enough that the support material, which is softer than the part material, is deformed as shown in FIG. 1. In FIG. 1, transfer of a layer of a part material 82 and support material 80 onto a previously-printed layer of support material 80 and part material 82 on a build platform 68 is shown, with the effects of the transfer shown in an exaggerated depiction. The downward pressure of the transfusion of the part material 82 is shown as arrow 102. This pressure causes previously-printed layers of the softer support material 80 to deform downward as indicated by arrow 104, and laterally, that is parallel to the build plane, as indicated by arrows 106 and 108. This deformation can cause misregistration of the layers of material, leading to a decrease in part quality or integrity.

Figure 2:
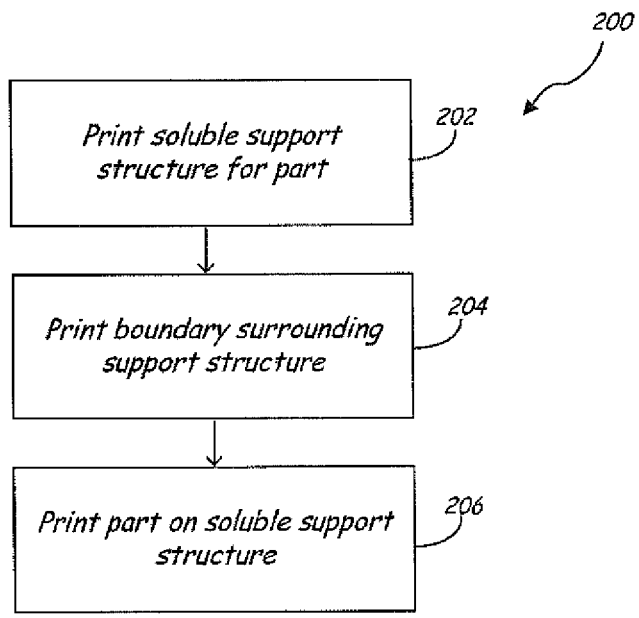
FIG. 2 is a flow chart diagram of a method according to an embodiment of the present disclosure.

In one embodiment, a method 200 of printing a part in an additive manufacturing system and reducing the deformation of the support material 80 during transfusion is shown in the flow chart diagram of FIG. 2. Method 200 comprises printing a support structure for the part in block 202, printing a boundary surrounding the support structure in block 204, and printing the part on the support structure in block 206. The part material, the support material, and the boundary material form a completed layer for transfusion to a previously deposited layer. It should be understood that in some embodiments, the order of printing is different, and that in some embodiments, as described herein, the layers of part, boundary, and support structure are transferred to a transfer medium, and are then transfused to a previously-printed layer together. Further, in one embodiment, the boundary and the part are printed simultaneously.

The boundary is printed with a material that is of sufficient strength to resist deformation of the support structure during printing of a layer of the part onto an existing layer. In one embodiment, the boundary is printed using part material. In another embodiment, the boundary is printed using a combination of part material and support material. In another embodiment, the boundary is printed using a third material that has sufficient strength to resist deformation of the support structure during printing. Printing the boundary with part material can increase throughput.

Further, a probe or other measuring device, such as an optical measurement device, a physical measuring device, or the like, may be used in another embodiment to measure a top of the boundary, a top of the part, and/or a top of the support, in order to provide feedback, for example through a controller, to control part height, and to maintain part and support heights within a predetermined tolerance. Closed loop feedback is used in one embodiment to continuously monitor and adjust printing to maintain a desired tolerance between part and support heights.

Figure 3:
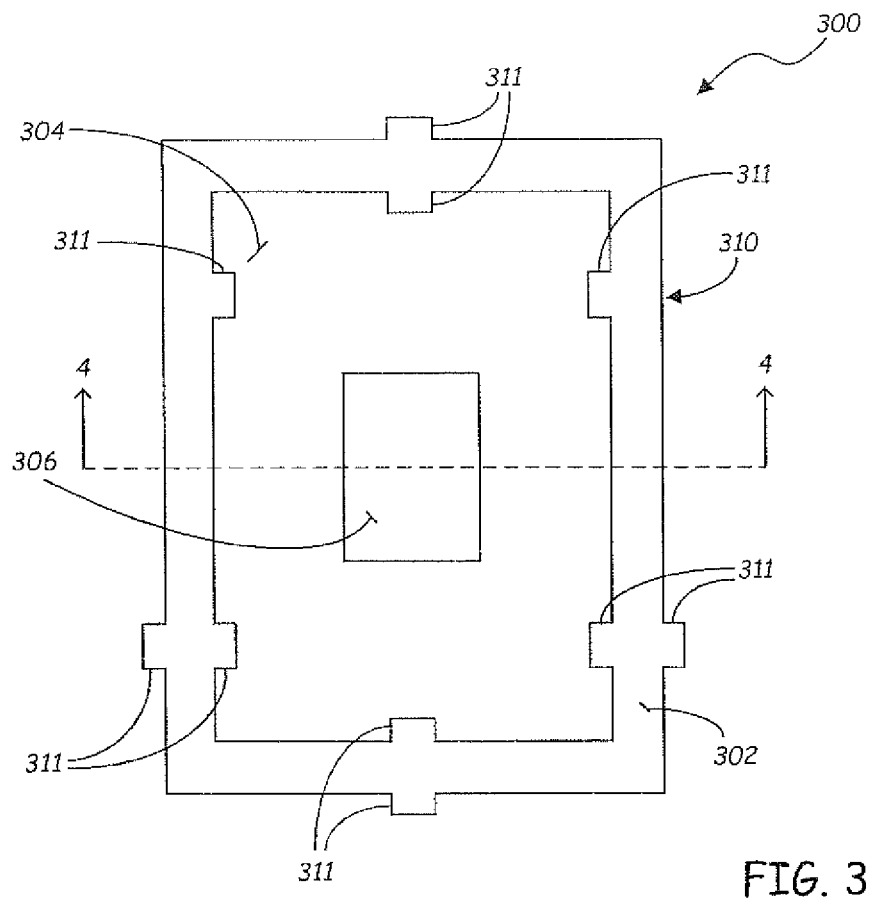
FIG. 3 is a top view of the part, support structure, and boundary shown in FIG. 3.
Figure 4:
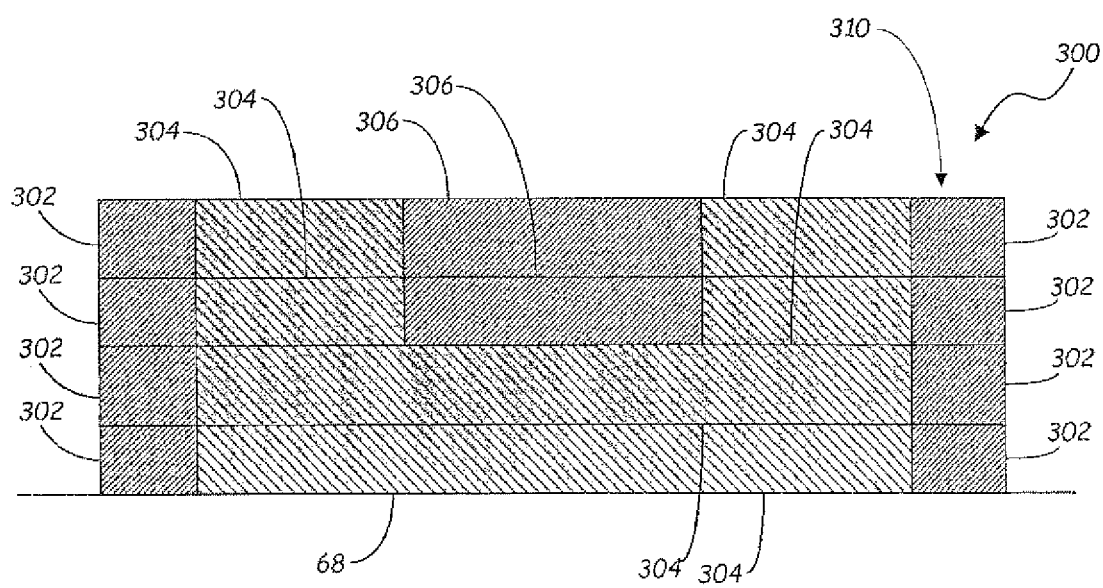
FIG. 4 is a sectional view along section line 4-4 in FIG. 3 of a part, support structure, and boundary built according to an embodiment of the present disclosure.

FIG. 3 is a top view of a boundary 310 of boundary material 302 surrounding support material 304 and part material 306. FIG. 4 is a cross-sectional view taken along section line 4-4 in FIG. 3 and illustrates a part, support structure, and boundary printed according to an embodiment of the present disclosure. Platform 68 supports layers of boundary material 302, layers of support material 304, and layers of part material 306. The boundary material 302 forms a boundary 310 that surrounds the support material 304.

Figure 6:
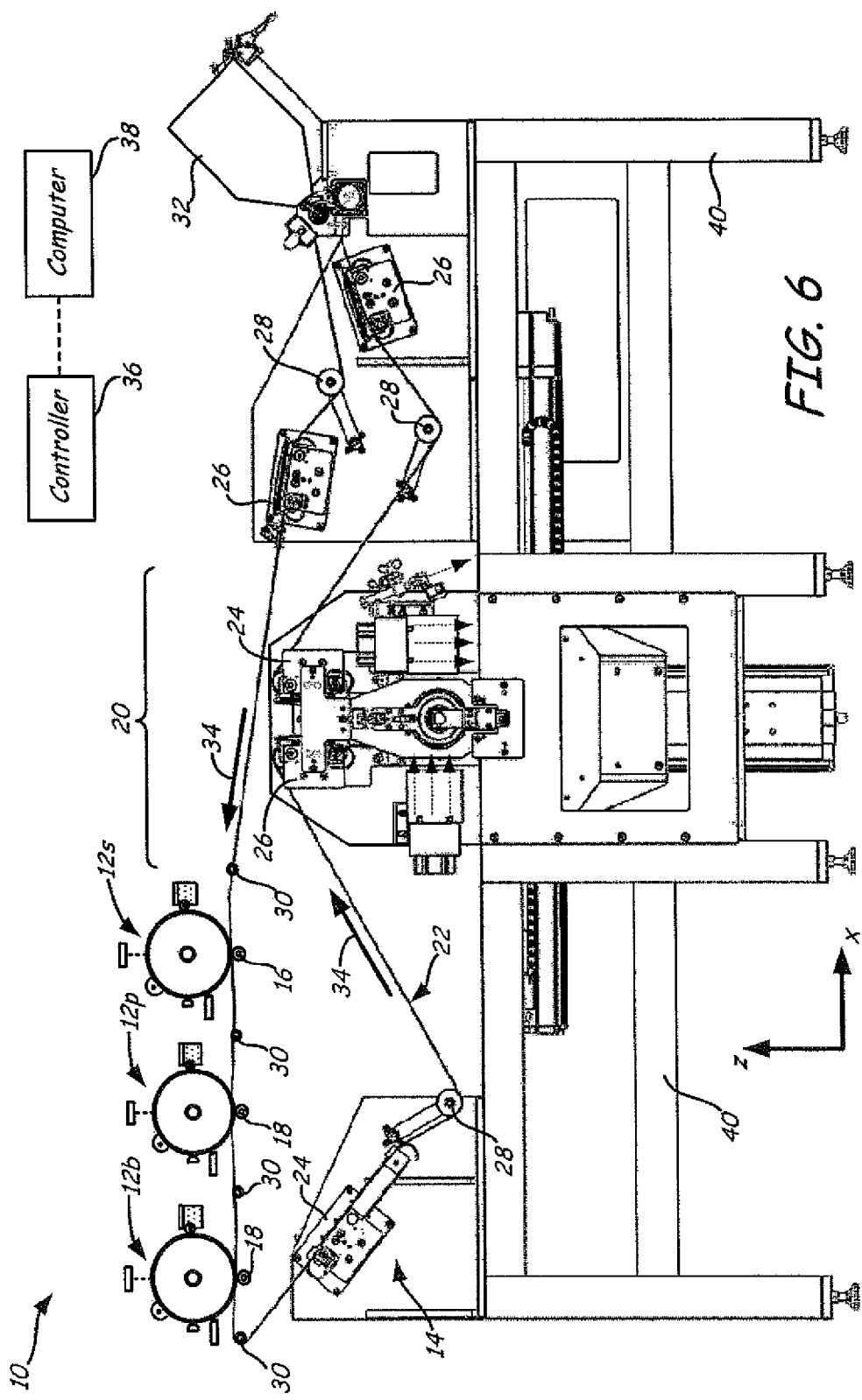
FIG. 6 is a front view of an example electrophotography-based additive manufacturing system for printing 3D parts, support structures, and boundaries from part, support, and boundary materials of the present disclosure.

The printing of the part 306, the boundary 302, and the support structure 304 is in one embodiment performed using an electrophotography-based additive manufacturing system such as that shown in FIG. 6. Printing in one embodiment comprises developing layers of the support structure, the boundary, and the part from charged material with support, boundary, and part electrophotography engines. The part material, the support material, and the boundary material are electrostatically attracted to develop a layer from the electrophotography engines to a transfer medium. The attracted layers are moved to a layer transfusion assembly with a transfer medium. The moved layers are then transfused to previously-printed layers of the support structure, boundary, and part with the layer transfusion assembly. The support structure, boundary, and part are in one embodiment printed with separate electrophotography-based engines. In another embodiment, printing of the support structure is performed using a first electrophotography-based engine and printing of the part and boundary are performed using a second electrophotography-based engine, wherein the part and boundary material are the same material.

In another embodiment, more than one layer is printed at a time, as follows. Part material and boundary material for layer i−1 are printed with a first EP engine, then support material for layer i−1 is printed with a second EP engine. Following that, part material and boundary material for layer i are printed with the first EP engine, and support material for layer i is printed with the second EP engine. When this pattern of multiple layers is transfused to the part, the layer i is on the top. In this embodiment, two layers are transferred to the belt for printing instead of one. That is, layer i−1 is a layer that is printed onto the existing part, and layer i is printed onto layer i−1, allowing the printing of two layers in rapid succession.

In another embodiment, the boundary such as boundary 310 may include one or more buttresses 311 formed at or with an interior or exterior surface of the boundary 310, to support or reinforce the boundary against lateral displacement. In one embodiment, the buttresses 311 are formed at or with the interior surface of the boundary 310 to maintain a maximum size of the layer. However, depending upon the size and configuration of the part 306 being printed, one or more buttresses 311 extending from the interior surface of the boundary 310 could interfere with the printing of the part 306. In the event that a buttress 311 would interfere with the printing of the part 306, then the buttress 311 can be printed with the exterior surface of the boundary 310. It is also contemplated that buttresses 311 can be utilized solely along the interior of the boundary 310, solely along the exterior of the boundary 310 or a combination of buttresses 311 along the interior and exterior of the boundary 310 can be used depending upon the size and configuration of the part 306 being printed. The type of buttress is chosen in one embodiment depending upon the structure being supported, and include without limitation angled buttresses, clasping buttresses, diagonal buttresses, and setback buttresses.

In another embodiment, a boundary is provided of a solid material. This solid material may be a solid structure provided as the boundary, and may be provided without printing the boundary. In another embodiment, the boundary may be provided as partially part material and partially support material.

Figure 5:
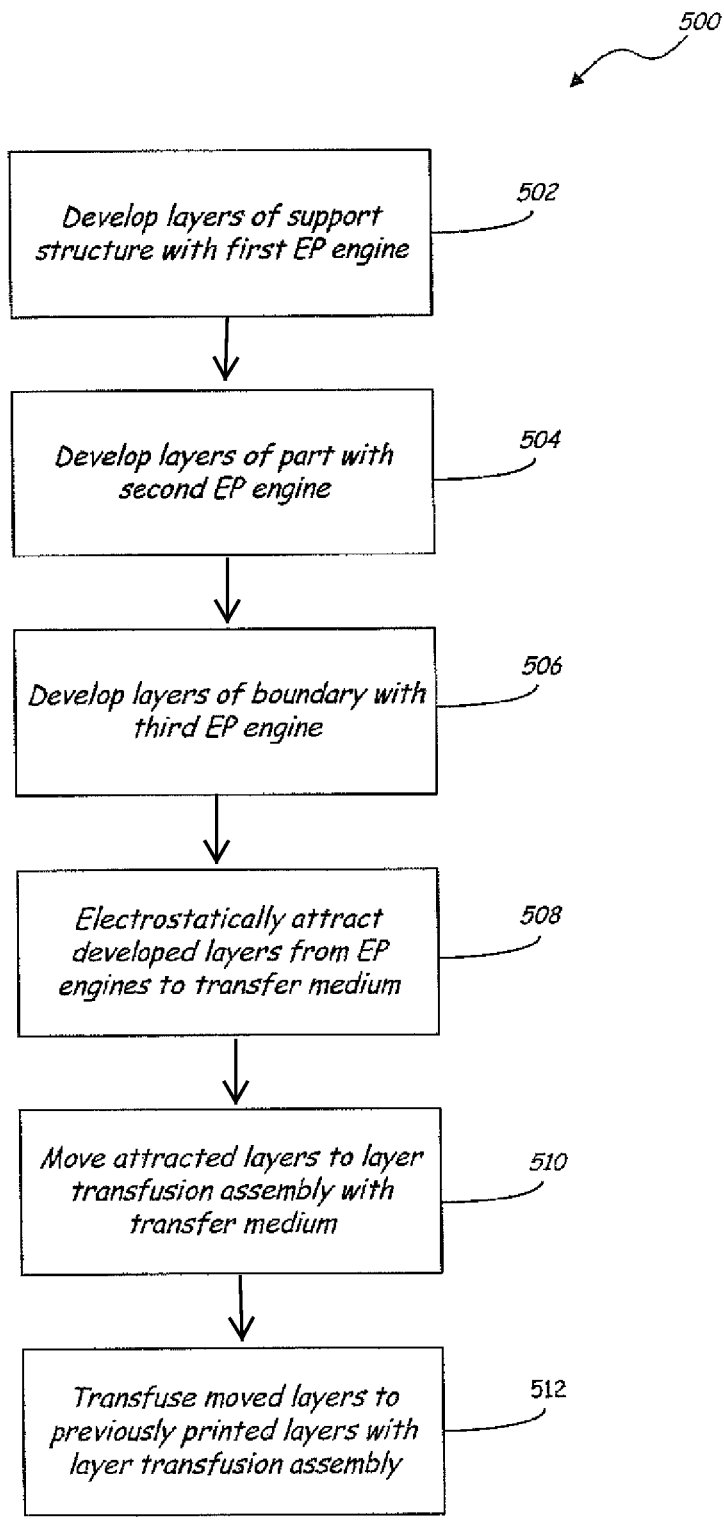
FIG. 5 is a flow chart diagram of a method according to another embodiment of the present disclosure.

Another method 500 for printing a part from part material, having a support structure of support material and a boundary of boundary material, with an electrophotography-based additive manufacturing system, is shown in FIG. 5. Method 500 comprises developing layers of the support structure from charged support material with a first electrophotography engine in block 502, developing layers of the part from charged part material with a second electrophotography engine in block 504, developing layers of the boundary from charged boundary material with a third electrophotography engine in block 506 to complete a developed layer. The developed layers from the electrophotography engines are electrostatically attracted to a transfer medium in block 508. The attracted layers are moved to a layer transfusion assembly with the transfer medium in block 510. The moved layers are transferred under pressure to previously-printed layers of the part, support structure, and boundary with the layer transfusion assembly in block 512. In one embodiment, the boundary is printed as a constraint against lateral expansion and vertical deformation of the support material during transfusion of the part, boundary, and support material onto a previously-printed layer.

Support material suitable for use with the embodiments of the present disclosure are disclosed and discussed in greater detail in commonly owned U.S. Pat. No. 9,029,058, the disclosure of which is incorporated by reference to the extent that it does not conflict with the present disclosure.

The support material functions as sacrificial material for the part material, and is desirable in cases where overhanging features are required in the final 3D part structure, where significant angular slopes exist in the 3D part, where it is essential to also preserve delicate features in the 3D part, such as small orifices or controlled pore structures, and in some situations, to laterally encase the 3D part. Once the 3D part has been printed, the support structure of the sacrificial support material may be removed to reveal the completed 3D part, preferably without damaging any of the critical or delicate geometrical features of the 3D part.

These requirements, however, have imparted significant challenges in producing a support material that is suitable for use in an electrophotography-based additive manufacturing system. For example, as discussed below, each layer of the support material is preferably transfused along with an associated layer of the part material. As such, the support material is selected in one embodiment to be compatible with the properties and rheology of its associated part material, such as, for example, thermal properties, elasticity, and melt rheology.

Moreover, the support material is preferably capable of accepting and maintaining a stable triboelectric charge that is similar to, or more preferably, substantially the same as that of the associated part material to allow the part, support, and boundary materials to be transferred to the layer transfusion assembly together. Furthermore, the support material is preferably capable of being produced in a powder-form using a cost-efficient processing technique, preferably exhibits good adhesion to the part material, and is preferably thermally stable during a layer transfusion process.

Accordingly, the support material of the present disclosure has been developed to balance these competing factors. Briefly, the support material compositionally includes a thermoplastic copolymer, a charge control agent, and optionally, a heat absorber and/or one or more additional materials, such as a flow control agent. In an exemplary support material composition, the thermoplastic copolymer includes aromatic groups, (meth)acrylate-based ester groups, carboxylic acid groups, and anhydride groups, where a ratio of the anhydride groups-to-carboxylic acid groups is preferably maximized or otherwise increased in favor of anhydride conversion for the copolymer, such as those found in copending and commonly owned U. S. Patent Publication No. 2015/0024309, which is incorporated in its entirety herein by reference.

An electrophotography-based additive manufacturing system for printing a three-dimensional part according to an embodiment of the present disclosure comprises a transfer medium configured to receive and transfer imaged layers of a thermoplastic-based powder for a boundary, a thermoplastic-based powder for a support, and a thermoplastic-based powder for the part from at least two imaging engines; a heater configured to heat the imaged layers on the transfer medium to at least a fusion temperature of the thermoplastic-based powder; and a layer transfusion assembly comprising a build platform, the layer transfusion assembly being configured to transfuse the heated layers in a layer-by-layer manner onto the build platform to print the three-dimensional part. The at least two imaging engines comprise in one embodiment a first imaging engine configured to print layers of part material and boundary material, wherein the part material and boundary material are the same, and a second imaging engine configured to print layers of support material different than the part and boundary material. In another embodiment, a separate imaging engine is used for each of the boundary, support, and part, using different materials for each.

FIGS. 6-9 illustrate system 10, which is an exemplary electrophotography-based additive manufacturing system for printing 3D parts from a part material (e.g., an ABS part material), and associated support structures from the support material of the present disclosure. As shown in FIG. 6, system 10 includes a trio of EP engines 12*p*, 12*s*, and 12*b*, belt transfer assembly 14, biasing mechanisms 16 and 18, and layer transfusion assembly 20. Examples of suitable components and functional operations for system 10 include those disclosed in Hanson et al., U.S. Pat. Nos. 8,879,957 and 8,488,994, and in Comb et al., U.S. Patent Publication Nos. 2013/0186549 and 2013/0186558.

EP engines 12*p*, 12*s*, and 12*b* are imaging engines for respectively imaging or otherwise developing layers of the part, support materials, and boundary, where the part, support, and boundary materials are each preferably engineered for use with the particular architecture of EP engine 12*p*, 12*s*, or 12*b*. As discussed below, the imaged layers may then be transferred to belt transfer assembly 14 (or other transfer medium) with biasing mechanisms 16 and 18, and carried to layer transfusion assembly 20 to print the 3D parts and associated support structures in a layer-by-layer manner.

In the shown embodiment, belt transfer assembly 14 includes transfer belt 22, belt drive mechanisms 24, belt drag mechanisms 26, loop limit sensors 28, idler rollers 30, and belt cleaner 32, which are configured to maintain tension on belt 22 while belt 22 rotates in the rotational direction of arrows 34. In particular, belt drive mechanisms 24 engage and drive belt 22, and belt drag mechanisms 26 may function as brakes to provide a service loop design for protecting belt 22 against tension stress, based on monitored readings via loop limit sensors 28.

System 10 also includes controller 36, which is one or more control circuits, microprocessor-based engine control systems, and/or digitally-controlled raster imaging processor systems, and which is configured to operate the components of system 10 in a synchronized manner based on printing instructions received from host computer 38. Host computer 38 is one or more computer-based systems configured to communicate with controller 36 to provide the print instructions (and other operating information). For example, host computer 38 may transfer information to controller 36 that relates to the sliced layers of the 3D parts and support structures, thereby allowing system 10 to print the 3D parts and support structures in a layer-by-layer manner.

The components of system 10 may be retained by one or more frame structures, such as system frame 40. Additionally, the components of system 10 are preferably retained within an enclosable housing (not shown) that prevents ambient light from being transmitted to the components of system 10 during operation.

FIG. 6 illustrates EP engines 12*p*, 12*s*, and 12*b*, where EP engine 12*s* (i.e., the upstream EP engine relative to the rotational direction of belt 22) develops layers of the support material, EP engine 12*p* (i.e., the midstream EP engine relative to the rotational direction of belt 22) develops layers of the part material, and EP engine 12*b* (i.e., the downstream EP engine relative to the rotational direction of belt 22) develops layers of the boundary material. In alternative embodiments, the arrangement of EP engines 12*p*, 12*s*, and 12*b* may be varied such that the EP engines are in a different order relative to the rotational direction of belt 22. In further alternative embodiments, system 10 may include four or more EP engines for printing layers of additional materials. In one embodiment, the third EP engine 12*b* is used to deposit a layer of a boundary that is placed external to the part and support material, so as to surround the support material. The boundary (e.g., boundary 310) is constructed in one embodiment from a boundary material that serves to support the part and provide back pressure against support material movement during the transfusion process. In some embodiments, where part material is used for the boundary 310, only two EP engines 12*p* and 12*s* are required.

Figure 7:
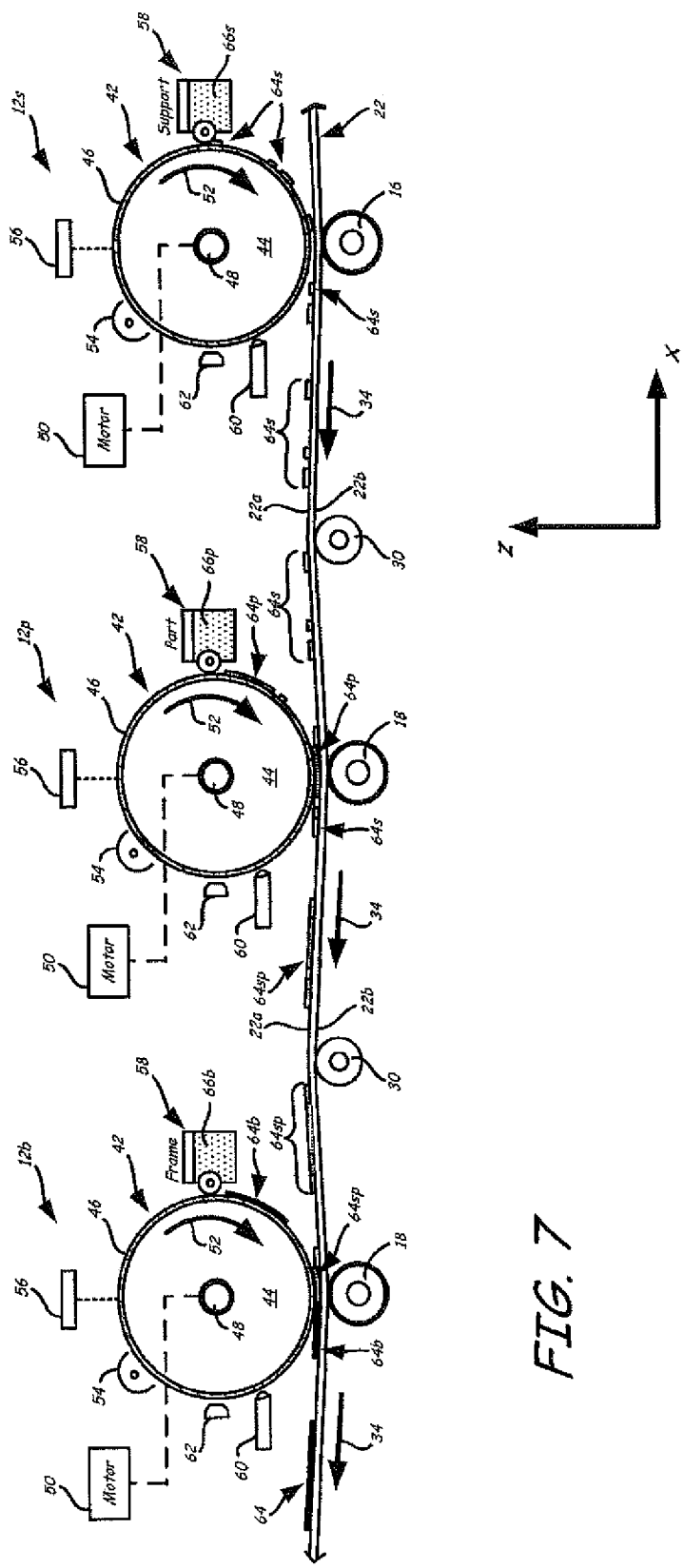
FIG. 7 is a schematic front view of three electrophotography engines of the system for developing layers of the part, support, and boundary materials.

In FIGS. 5, 6, and 7, EP engines 12*p*, 12*s*, and 12*b* may include the same components, such as photoconductor drum 42 having conductive drum body 44 and photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate shaft 48 (and photoconductor drum 42) in the direction of arrow 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, surface 46 is configured to receive latent-charged images of the sliced layers of a 3D part or support structure (or negative images), and to attract charged particles of the part or support material of the present disclosure to the charged or discharged image areas, thereby creating the layers of the 3D part or support structure.

As further shown, EP engines 12*p*, 12*s*, and 12*b* also includes charge inducer 54, imager 56, development station 58, cleaning station 60, and discharge device 62, each of which may be in signal communication with controller 36. Charge inducer 54, imager 56, development station 58, cleaning station 60, and discharge device 62 accordingly define an image-forming assembly for surface 46 while drive motor 50 and shaft 48 rotate photoconductor drum 42 in the direction of arrow 52.

In the shown example, the image-forming assembly for surface 46 of EP engine 12*s* is used to form layers 64*s* of the support material (referred to as support material 66*s*), where a supply of support material 66*s* may be retained by development station 58 (of EP engine 12*s*) along with carrier particles. Similarly, the image-forming assembly for surface 46 of EP engine 12*p* is used to form layers 64*p* of the part material (referred to as part material 66*p*), where a supply of part material 66*p* may be retained by development station 58 (of EP engine 12*p*) along with carrier particles. Similarly, the image-forming assembly for surface 46 of EP engine 12*b* is used to form layers 64*b* of the boundary material (referred to as boundary material 66*b*), where a supply of boundary material 66*b* may be retained by development station 58 (of EP engine 12*b*) along with carrier particles.

Charge inducer 54 is configured to generate a uniform electrostatic charge on surface 46 as surface 46 rotates in the direction of arrow 52 past charge inducer 54. Suitable devices for charge inducer 54 include corotrons, scorotrons, charging rollers, and other electrostatic charging devices.

Imager 56 is a digitally-controlled, pixel-wise light exposure apparatus configured to selectively emit electromagnetic radiation toward the uniform electrostatic charge on surface 46 as surface 46 rotates in the direction of arrow 52 past imager 56. The selective exposure of the electromagnetic radiation to surface 46 is directed by controller 36, and causes discrete pixel-wise locations of the electrostatic charge to be removed (i.e., discharged to ground), thereby forming latent image charge patterns on surface 46.

Suitable devices for imager 56 include scanning laser (e.g., gas or solid state lasers) light sources, light emitting diode (LED) array exposure devices, and other exposure device conventionally used in 2D electrophotography systems. In alternative embodiments, suitable devices for charge inducer 54 and imager 56 include ion-deposition systems configured to selectively directly deposit charged ions or electrons to surface 46 to form the latent image charge pattern. As such, as used herein, the term "electrophotography" includes ionography.

Each development station 58 is an electrostatic and magnetic development station or cartridge that retains the supply of part material 66*p*, support material 66*s*, or boundary material 66*b*, preferably in powder form, along with carrier particles. Development stations 58 may function in a similar manner to single or dual component development systems and toner cartridges used in 2D electrophotography systems. For example, each development station 58 may include an enclosure for retaining the part material 66*p*, support material 66*s*, or boundary material 66*b* and carrier particles. When agitated, the carrier particles generate triboelectric charges to attract the powders of the part material 66*p*, support material 66*s*, or boundary material 66*b* which charges the attracted powders to a desired sign and magnitude, as discussed below.

Each development station 58 may also include one or more devices for transferring the charged part material 66*p*, support material 66*s*, or boundary material 66*b* to surface 46, such as conveyors, fur brushes, paddle wheels, rollers, and/or magnetic brushes. For instance, as surface 46 (containing the latent charged image) rotates from imager 56 to development station 58 in the direction of arrow 52, the charged part material 66*p*, support material 66*s*, or boundary material 66*b* is attracted to the appropriately charged regions of the latent image on surface 46, utilizing either charged area development or discharged area development (depending on the electrophotography mode being utilized). This creates successive layers 64*p*, 64*s*, or 64*b* as photoconductor drum 12 continues to rotate in the direction of arrow 52, where the successive layers 64*p*, 64*s*, or 64*b* correspond to the successive sliced layers of the digital representation of the 3D part or support structure.

The successive layers 64*p*, 64*s*, or 64*b* are then rotated with surface 46 in the direction of arrow 52 to a transfer region in which layers 64*p*, 64*s*, or 64*b* are successively transferred from photoconductor drum 42 to belt 22, as discussed below. While illustrated as a direct engagement between photoconductor drum 42 and belt 22, in some preferred embodiments, EP engines 12*p*, 12*s*, and 12*b* may also include intermediary transfer drums and/or belts, as discussed further below.

After a given layer 64*p*, 64*s*, or 64*b* is transferred from photoconductor drum 42 to belt 22 (or an intermediary transfer drum or belt), drive motor 50 and shaft 48 continue to rotate photoconductor drum 42 in the direction of arrow 52 such that the region of surface 46 that previously held the layer 64*p* or 64*s* passes cleaning station 60. Cleaning station 60 is a station configured to remove any residual, non-transferred portions of part, support, or boundary material 66*p*, 66*s*, or 66*b*. Suitable devices for cleaning station 60 include blade cleaners, brush cleaners, electrostatic cleaners, vacuum-based cleaners, and combinations thereof.

After passing cleaning station 60, surface 46 continues to rotate in the direction of arrow 52 such that the cleaned regions of surface 46 pass discharge device 62 to remove any residual electrostatic charge on surface 46, prior to starting the next cycle. Suitable devices for discharge device 62 include optical systems, high-voltage alternating-current corotrons and/or scorotrons, one or more rotating dielectric rollers having conductive cores with applied high-voltage alternating-current, and combinations thereof.

Transfer belt 22 is a transfer medium for transferring the developed successive layers 64*p*, 64*s*, and 64*b* from photoconductor drum 42 (or an intermediary transfer drum or belt) to layer transfusion assembly 16. Examples of suitable transfer belts for belt 22 include those disclosed in Comb et al., U.S. Patent Application Publication Nos. 2013/0186549 and 2013/0186558. Belt 22 includes front surface 22*a* and rear surface 22*b*, where front surface 22*a* faces surfaces 46 of photoconductor drums 42 and rear surface 22*b* is in contact with biasing mechanisms 16 and 18.

Biasing mechanisms 16 and 18 are configured to induce electrical potentials through belt 22 to electrostatically attract layers 64*p*, 64*s*, and 64*b* from EP engines 12*p*, 12*s*, and 12*b* to belt 22. Because layers 64*p*, 64*s*, and 64*b* are each only a single layer increment in thickness at this point in the process, electrostatic attraction is suitable for transferring layers 64*p*, 64*s*, and 64*b* from EP engines 12*p*, 12*s*, and 12*b* to belt 22.

Controller 36 preferably rotates photoconductor drums 36 of EP engines 12*p*, 12*s*, and 12*b* at the same rotational rates that are synchronized with the line speed of belt 22 and/or with any intermediary transfer drums or belts. This allows system 10 to develop and transfer layers 64*p*, 64*s*, and 64*b* in coordination with each other from separate developer images. In particular, as shown, each part layer 64*p* may be transferred to belt 22 with proper registration with each support layer 64*s* to preferably produce a combined part and support material layer 64*sp*, and each part and support material layer 64*sp* may be transferred to belt 22 with proper registration with each boundary layer 64 to preferably produce a combined part, support, and boundary material layer 64. This allows layers 64*p*, 64*s*, and 64*b* to be transfused together, requiring the part, support, and boundary materials to have thermal properties and melt rheologies that are similar or substantially the same (as discussed in issued U.S. Pat. No. 9,029,058). As can be appreciated, some layers transferred to layer transfusion assembly 20 may only include support material 66*s* or may only include part material 66*p* or may only include boundary material 66*b*, depending on the particular support structure, boundary, and 3D part geometries and layer slicing.

In an alternative and less-preferred embodiment, part layers 64*p*, support layers 64*s*, and boundary layers 64*b* may optionally be developed and transferred along belt 22 separately, such as with alternating layers 64*p*, 64*s*, and 64*b*. These successive, alternating layers 64*p*, 64*s*, and 64*b* may then be transferred to layer transfusion assembly 20, where they may be transfused separately to print the 3D part, support structure, and boundary.

Figure 8:
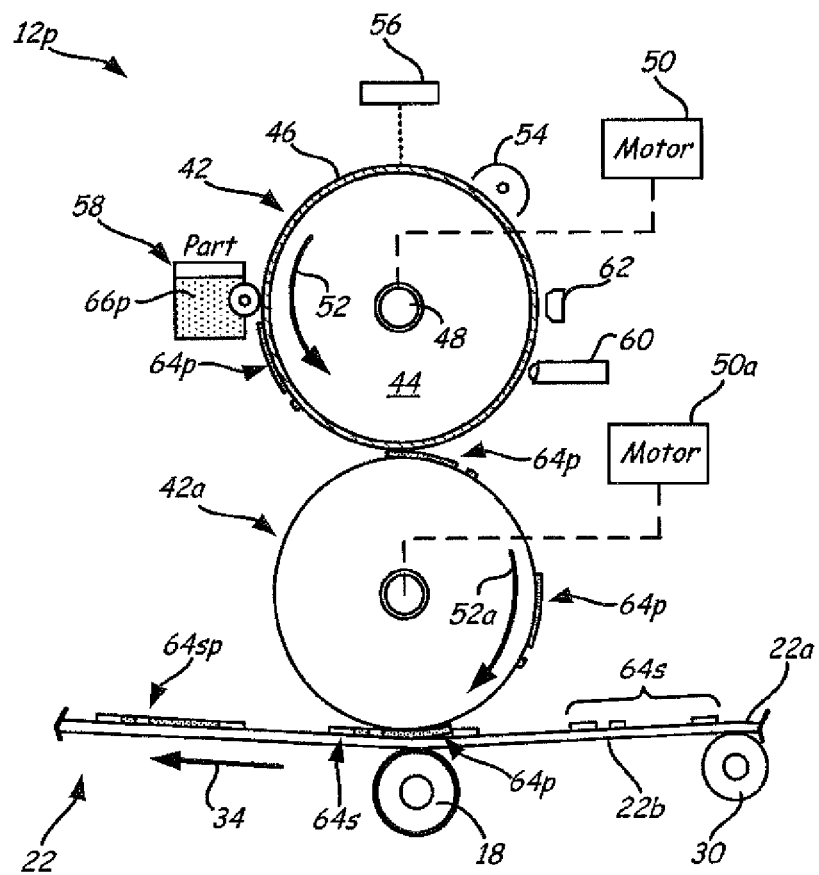
FIG. 8 is a schematic front view of an alternative electrophotography engine, which includes an intermediary drum.

In some preferred embodiments, one or more of EP engines 12*p*, 12*s*, and 12*b* may also include one or more intermediary transfer drums and/or belts between photoconductor drum 42 and belt 22. For example, as shown in FIG. 8, EP engine 12*p* may also include intermediary drum 42*a* that rotates an opposing rotational direction from arrow 52, as illustrated by arrow 52*a*, under the rotational power of motor 50*a*. Intermediary drum 42*a* engages with photoconductor drum 42 to receive the developed layers 64*p* from photoconductor drum 42, and then carries the received developed layers 64*p* and transfers them to belt 22.

EP engine 12*s* may include the same arrangement of intermediary drum 42*a* for carrying the developed layers 64*s* from photoconductor drum 42 to belt 22. EP engine 12*b* may include the same arrangement of intermediary drum 42*a* for carrying the developed layers 64*b* from photoconductor drum 42 to belt 22. The use of such intermediary transfer drums or belts for EP engines 12*p*, 12*s*, and 12*b* can be beneficial for thermally isolating photoconductor drum 42 from belt 22, if desired.

Figure 9:
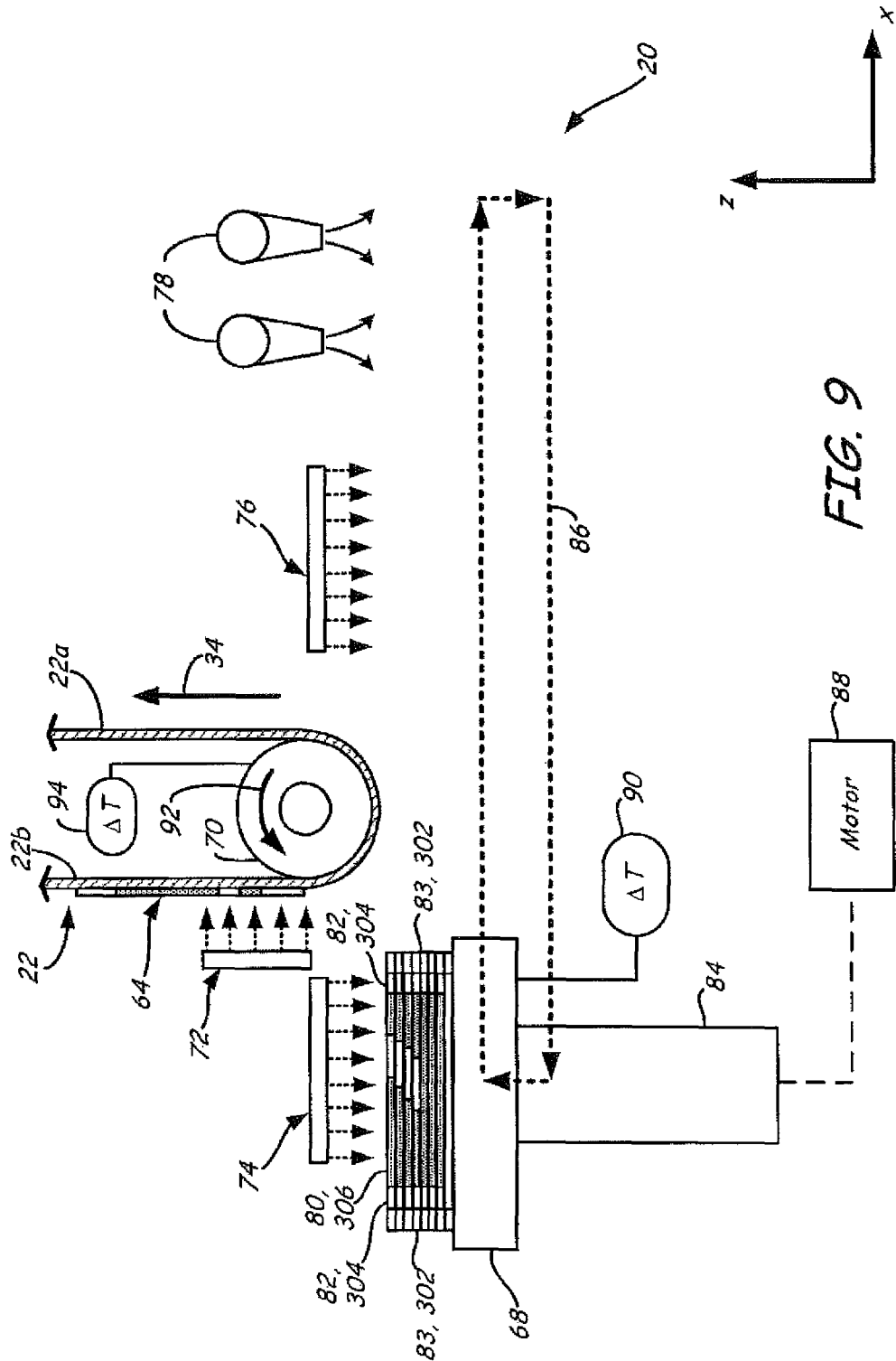
FIG. 9 is a schematic front view of a layer transfusion assembly of a system for performing layer transfusion steps with the developed layers where the layers are shown in a section view.

FIG. 9 illustrates an example embodiment for layer transfusion assembly 20. As shown, layer transfusion assembly 20 includes build platform 68, nip roller 70, heaters 72 and 74, post-fuse heater 76, and air jets 78 (or other cooling units). FIG. 9 is shown in side elevation, except for the layer 64 and the part, support, and boundary on build platform 68, which are shown in section view. Build platform 68 is a platform assembly or platen of system 10 that is configured to receive the heated combined layers 64 (or separate layers 64*p*, 64*s*, and 64*b*) for printing a 3D part, support structure and boundary, referred to as 3D part 80, support structure 82, and boundary 83 in a layer-by-layer manner. In some embodiments, build platform 68 may include removable film substrates (not shown) for receiving the printed layers 64, where the removable film substrates may be restrained against build platform using any suitable technique (e.g., vacuum drawing, removable adhesive, mechanical fastener, and the like).

Build platform 68 is supported by gantry 84, which is a gantry mechanism configured to move build platform 68 along the z-axis and the x-axis to produce a reciprocating rectangular pattern, where the primary motion is back-and-forth along the x-axis (illustrated by broken lines 86). Gantry 84 may be operated by motor 88 based on commands from controller 36, where motor 88 may be an electrical motor, a hydraulic system, a pneumatic system, or the like.

In the shown embodiment, build platform 68 is heatable with heating element 90 (e.g., an electric heater). Heating element 90 is configured to heat and maintain build platform 68 at an elevated temperature that is greater than room temperature (25° C.), such as at a desired average part temperature of 3D part 80, support structure 82, and/or boundary 83, as discussed in Comb et al., U.S. Patent Publication Nos. 2013/0186549 and 2013/0186558. This allows build platform 68 to assist in maintaining 3D part 80, support structure 82, and/or boundary 83 at this average part temperature.

Nip roller 70 is an example heatable element or heatable layer transfusion element, which is configured to rotate around a fixed axis with the movement of belt 22. In particular, nip roller 70 may roll against rear surface 22b in the direction of arrow 92 while belt 22 rotates in the direction of arrow 34. In the shown embodiment, nip roller 70 is heatable with heating element 94 (e.g., an electric heater). Heating element 94 is configured to heat and maintain nip roller 70 at an elevated temperature that is greater than room temperature (25° C.), such as at a desired transfer temperature for layers 64.

Heater 72 is one or more heating devices (e.g., an infrared heater and/or a heated air jet) configured to heat layers 64 to a temperature near an intended transfer temperature of the part, support, and boundary materials, such as at least a fusion temperature of the part, support, and boundary materials, preferably prior to reaching nip roller 70. Each layer 64 desirably passes by (or through) heater 72 for a sufficient residence time to heat the layer 64 to the intended transfer temperature. Heater 74 may function in the same manner as heater 72, and heats the top surfaces of 3D part 80, support structure 82, and boundary 83 to an elevated temperature, such as at the same transfer temperature as the heated layers 64 (or other suitable elevated temperature).

As mentioned above, the support material 66s used to print support structure 82 is selected in one embodiment to be compatible with the properties and rheology of the part material 66p used to print 3D part 80 and the boundary material 66b used to print boundary 83, such as, for example, thermal properties, elasticity, and melt rheology. This allows part, support, and boundary materials of layers 64p, 64s, and 64b to be heated together with heater 74 to substantially the same transfer temperature, and also allows the part, support, and boundary materials at the top surfaces of 3D part 80, support structure 82, and boundary 83 to be heated together with heater 74 to substantially the same temperature. Thus, the part layers 64p, the support layers 64s, and the boundary layers 64b may be transfused together to the top surfaces of 3D part 80, support structure 82, and boundary 83 in a single transfusion step as combined layer 64. This single transfusion step for transfusing the combined layer 64 is not believed to be feasible without matching the thermal properties and the melt rheologies of the part, support, and boundary materials. In another embodiment, since the bulk properties of partially formed parts are more elastic that flowable, temperature dependent elasticities of the part and support materials may also be matched.

Post-fuse heater 76 is located downstream from nip roller 70 and upstream from air jets 78, and is configured to heat the transfused layers to an elevated temperature in the post-fuse or heat-setting step. Again, the similar thermal properties and melt rheologies of the part, support, and boundary materials allow post-fuse heater 76 to post-heat the top surfaces of 3D part 80, support structure 82, and boundary 83 together in a single post-fuse step.

Prior to printing 3D part 80, support structure 82, and boundary 83, build platform 68 and nip roller 70 may be heated to their desired temperatures. For example, build platform 68 may be heated to the average part temperature of 3D part 80, support structure 82, and boundary 83 (due to the close melt rheologies of the part, support, and boundary materials). In comparison, nip roller 70 may be heated to a desired transfer temperature for layers 64 (also due to the similar thermal properties and melt rheologies of the part, support, and boundary materials).

During the printing operation, belt 22 carries a layer 64 past heater 72, which may heat the layer 64 and the associated region of belt 22 to the transfer temperature. Suitable transfer temperatures for the part, support, and boundary materials include temperatures that exceed the glass transition temperatures of the part, support, and boundary materials, which are preferably similar or substantially the same, and where the part, support, and boundary materials of layer 64 are softened but not melted (e.g., a temperature of ranging from about 140° C. to about 180° C. for an ABS part material).

As further shown in FIG. 9, during operation, gantry 84 may move build platform 68 (with 3D part 8, support structure 82, and boundary 83) in a reciprocating rectangular pattern 86. In particular, gantry 84 may move build platform 68 along the x-axis below, along, or through heater 74. Heater 74 heats the top surfaces of 3D part 80, support structure 82, and boundary 83 to an elevated temperature, such as the transfer temperatures of the part, support, and boundary materials. As discussed in Comb et al., U.S. Patent Application Publication Nos. 2013/0186549 and 2013/0186558, heaters 72 and 74 may heat layers 64 and the top surfaces of 3D part 80, support structure 82, and boundary 83 to about the same temperatures to provide a consistent transfusion interface temperature. Alternatively, heaters 72 and 74 may heat layers 64 and the top surfaces of 3D part 80, support structure 82, and boundary 83 to different temperatures to attain a desired transfusion interface temperature.

The continued rotation of belt 22 and the movement of build platform 68 align the heated layer 64 with the heated top surfaces of 3D part 80, support structure 82, and boundary 83 with proper registration along the x-axis. Gantry 84 may continue to move build platform 68 along the x-axis, at a rate that is synchronized with the rotational rate of belt 22 in the direction of arrow 34 (i.e., the same directions and speed). This causes rear surface 22b of belt 22 to rotate around nip roller 70 to nip belt 22 and the heated layer 64 against the top surfaces of 3D part 80, support structure 82, and boundary 83. This presses the heated layer 64 between the heated top surfaces of 3D part 80, support structure 82, and boundary 83 at the location of nip roller 70, which at least partially transfuses heated layer 64 to the top layers of 3D part 80, support structure 82, and boundary 83.

As the transfused layer 64 passes the nip of nip roller 70, belt 22 wraps around nip roller 70 to separate and disengage from build platform 68. This assists in releasing the transfused layer 64 from belt 22, allowing the transfused layer 64 to remain adhered to 3D part 80, support structure 82, and boundary 83. Maintaining the transfusion interface temperature at a transfer temperature that is higher than the glass transition temperatures of the part, support, and boundary materials, but lower than their fusion temperatures, allows the heated layer 64 to be hot enough to adhere to 3D part 80, support structure 82, and boundary 83, while also being cool enough to readily release from belt 22. Additionally, as discussed above, the similar thermal properties and melt rheologies of the part, support, and boundary materials allow them to be transfused in the same step.

After release, gantry 84 continues to move build platform 68 along the x-axis to post-fuse heater 76. At post-fuse heater 76, the top-most layers of 3D part 80, support structure 82, and boundary 83 (including the transfused layer 64) may then be heated to at least the fusion temperature of the part, support, and boundary materials in a post-fuse or heat-setting step. This melts the part, support, and boundary materials of the transfused layer 64 to a highly fusible state such that polymer molecules of the transfused layer 64 quickly inter-diffuse to achieve a high level of interfacial entanglement with 3D part 80, support structure 82, and boundary 83.

Additionally, as gantry 84 continues to move build platform 68 along the x-axis past post-fuse heater 76 to air jets 78, air jets 78 blow cooling air towards the top layers of 3D part 80, support structure 82, and boundary 83. This actively cools the transfused layer 64 down to the average part temperature, as discussed in Comb et al., U.S. Publication Nos. 2013/0186549 and 2013/0186558.

To assist in keeping 3D part 80, support structure 82, and boundary 83 at the average part temperature, in some preferred embodiments, heater 74 and/or post-heater 76 may operate to heat only the top-most layers of 3D part 80, support structure 82, and boundary 83. For example, in embodiments in which heaters 72, 74, and 76 are configured to emit infrared radiation, 3D part 80, support structure 82, and boundary 83 may include heat absorbers and/or other colorants configured to restrict penetration of the infrared wavelengths to within the top-most layers. Alternatively, heaters 72, 74, and 76 may be configured to blow heated air across the top surfaces of 3D part 80, support structure 82, and boundary 83. In either case, limiting the thermal penetration into 3D part 80, support structure 82, and boundary 83 allows the top-most layers to be sufficiently transfused, while also reducing the amount of cooling required to keep 3D part 80, support structure 82, and boundary 83 at the average part temperature.

Gantry 84 may then actuate build platform 68 downward, and move build platform 68 back along the x-axis to a starting position along the x-axis, following the reciprocating rectangular pattern 86. Build platform 68 desirably reaches the starting position for proper registration with the next layer 64. In some embodiments, gantry 84 may also actuate build platform 68 and 3D part 80/support structure 82/boundary 83 upward for proper registration with the next layer 64. The same process may then be repeated for each remaining layer 64 of 3D part 80, support structure 82, and boundary 83.

In some preferred embodiments, a resulting 3D part 80 is encased laterally (i.e., horizontally to the build plane) in the support structure 82, such as shown in FIG. 9. This is believed to provide good dimensional integrity and surface quality for the 3D part 80 while using a reciprocating build platen 68 and a nip roller 70. In addition, to provide support for the support structure against lateral and vertical deformation, that is, back pressure for the transfuse process, the boundary 83 encases the support structure 82 laterally on all sides, as shown in greater detail in FIGS. 3-4.

An electrostatically printed three-dimensional block part, such as part 80, comprises in one embodiment a printed part, a removable support surrounding the printed part, and a boundary surrounding the removable support, the boundary having a strength greater than the support. The part and the support material are undeformed after pressure transfusion in a three-dimensional printing process. In one embodiment, the boundary constrains the support against lateral expansion during transfusion of layers of the part and support. In another embodiment, the boundary further comprises a buttress to further constrain the support against lateral expansion.

After the printing operation is completed, the resulting 3D part 80, support structure 82, and boundary 83 may be removed from system 10 and undergo one or more post-printing operations. For example, support structure 82 derived from the support material and boundary 83 derived from boundary material may be sacrificially removed from 3D part 80, such as by using an aqueous-based solution (e.g., an aqueous alkali solution). Under this preferred technique, support structure 82 may at least partially dissolve in the solution, separating it from 3D part 80 and boundary 83 in a hands-free manner.

In comparison, part materials such as an ABS part material are chemically resistant to aqueous alkali solutions. This allows the use of an aqueous alkali solution to be employed for removing the sacrificial support structure 82 without degrading the shape or quality of 3D part 80. Examples of suitable systems and techniques for removing support structure 82 in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Alternatively, in some embodiments, prior to removal of the sacrificial support structure 82, post processing of parts includes in one embodiment chucking (e.g., restraining) the part and build sheet, for example with a magnetic chuck, and subsequently machining the boundary 83 from the vertical walls of the support material prior to dissolution thereof.

Furthermore, after support structure 82 is removed, 3D part 80 may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

Collectively (prior to removal of the support structure), the 3D part (e.g., 3D part 80) printed from the ABS part material and the support structure (e.g., support structure 82) printed from the support material of the present disclosure may be provided as an "object" where the 3D part and support structure are adhered to each other. Prior to removal of the support structure from the 3D part, the support structure may support overhanging features of the 3D part, significant angular slopes exist in the 3D part, areas where it is essential to also preserve delicate features in the 3D part, such as small orifices or controlled pore structures, and in some situations, to laterally encase the 3D part.

Figure 10:
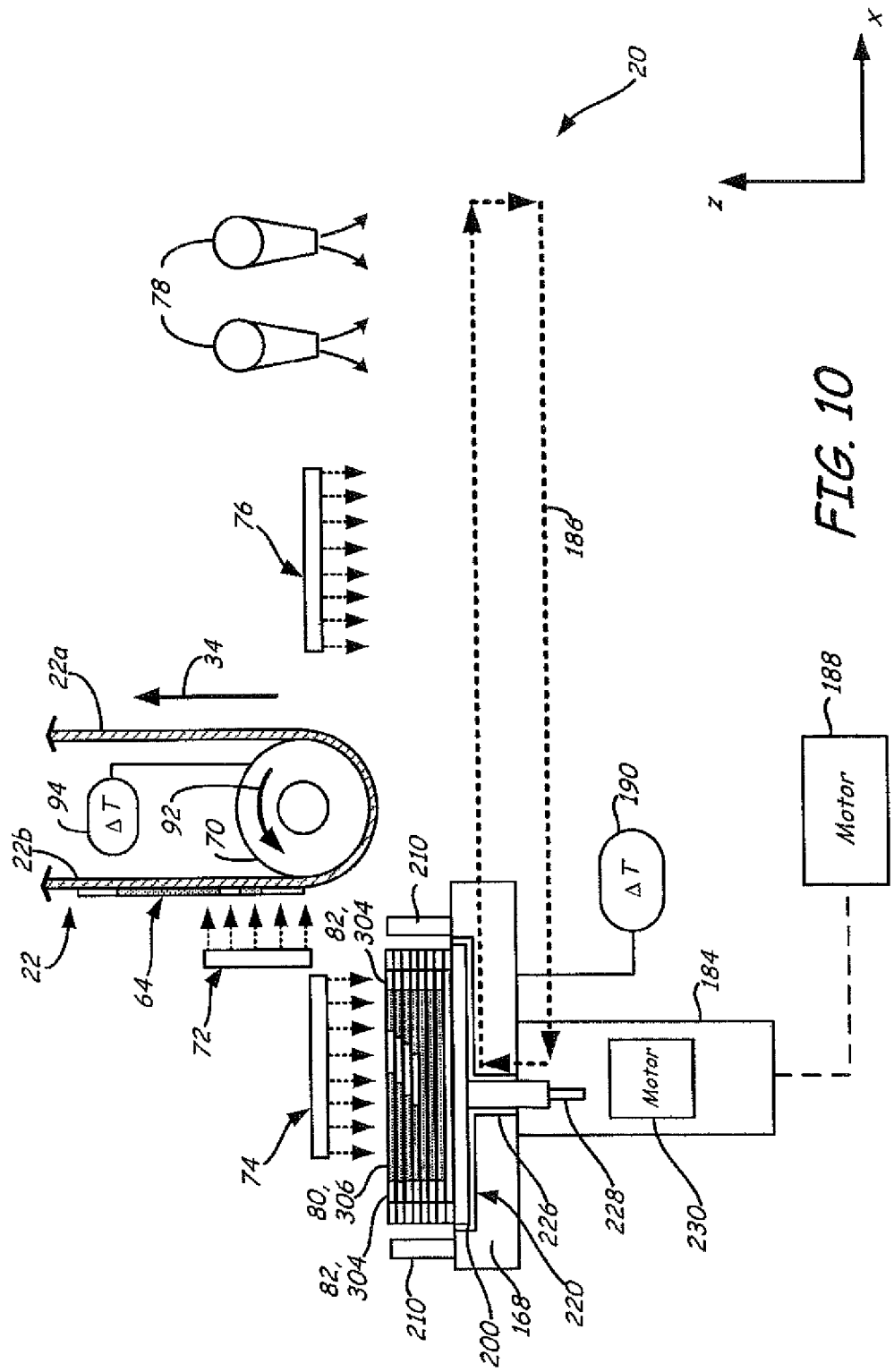
FIG. 10 is a schematic front view of a layer transfusion assembly of a system for performing layer transfusion steps with a permanent border surrounding the developed layers where the layers are shown in a section view.
Figure 11:
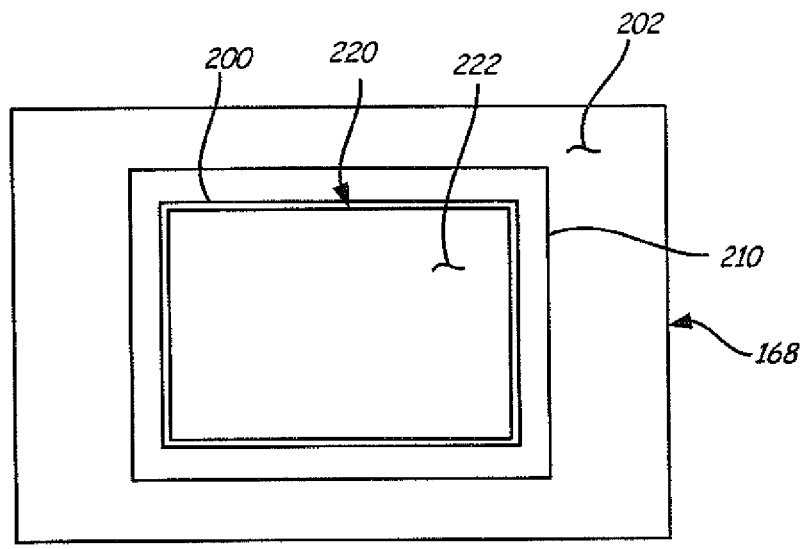
FIG. 11 is a schematic top view of the build platform of FIG. 10.

Referring to FIG. 10, another embodiment includes a build platform 168 that is movable along a pattern 186 similar to pattern 86 shown in FIG. 9. Build platform 168 is supported by gantry 184 configured to move build platform 168 along the z-axis and the x-axis to produce a reciprocating rectangular pattern, where the primary motion is back-and-forth along the x-axis (illustrated by broken lines 186). Gantry 184 may be operated by motor 188 based on commands from controller 136, where motor 188 may be an electrical motor, a hydraulic system, a pneumatic system, or the like. In this embodiment, build platform 168 has an opening 200 in a top surface 202 that is recessed into the body of the build platform 168. Further, the build platform 168 has a built-in permanent boundary 210 around an exterior of the recessed opening 200. This is shown in side section view in FIG. 10 and in top view in FIG. 11.

Figure 12:
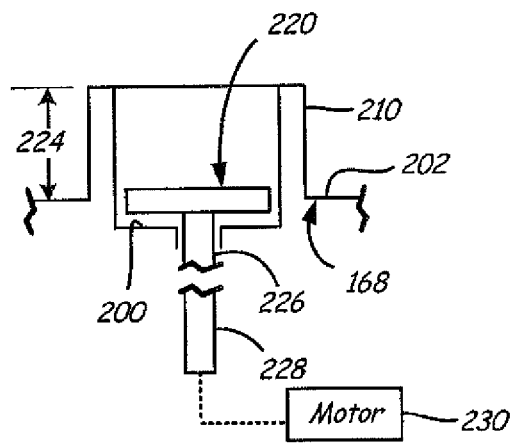
FIG. 12 is a partial side elevation view of a movable platen in a home position according to an embodiment of the present disclosure.

Opening 200 is sized to receive a platen 220 on which a three-dimensional part is built. The permanent boundary 210 constrains a support for a part being built against lateral expansion during transfusion of layers of the part and support. The platen 220 is movable in a z-direction from a home position to a printing position, shown in FIGS. 12 and 13 respectively. In the home position as shown in section in FIG. 12, the platen 220 rests in the opening 200 and its top 222 is even with the top 202 of build platform 168. This position, along with the boundary 210, allows for printing a part with a height of up to height 224 of the boundary 210 with full lateral support of the layers of the part that are already printed.

In one embodiment, platen 220 is coupled to a support 226 which is coupled to a motor 230 through an actuator 228. Platen 220, support 226, actuator 228, and motor 230 are in one embodiment carried by the build platform 168, and therefore move with the motion of the build platform 168.

Figure 13:
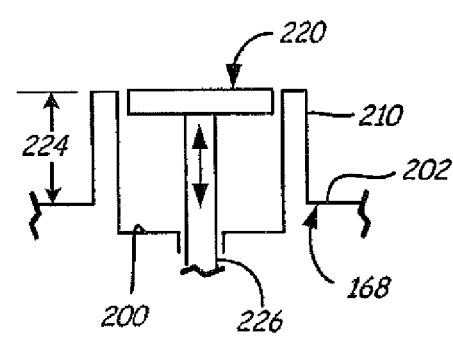
FIG. 13 is a partial side elevation view of the movable platen of FIG. 12 in a printing position.
Figure 14:
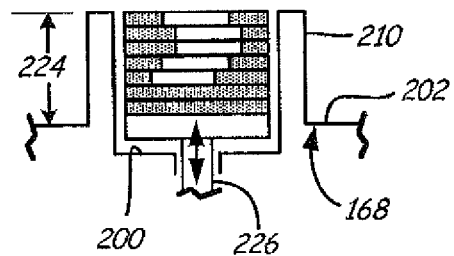
FIG. 14 is a partial side elevation view of the movable platen of FIGS. 12 and 13 showing a number of layers having been printed on the movable platen 220.

To print a layer of a three-dimensional part, and support material, using the platen 220 and boundary 210, the platen 220 is raised to its initial printing position as shown in FIG. 13. In FIG. 13, the platen 220 is raised to a height substantially equal to the height 224 of the boundary 210, or slightly higher. A layer of part material and support material are transferred to a transfer medium such as transfer belt 22 as described herein. The build platform 168 and platen 220 are moved into printing position, and a nip roller such as nip roller 70 is used to transfuse the layer of part material and support material to the platen 220. As subsequent layers are added to the part on platen 220, the position of platen 220 is adjusted by lowering the platen 220 a distance corresponding to a thickness of a layer to allow the boundary 210 to provide lateral support for the printed layers as additional layers are added to the three-dimensional part. As shown in FIG. 14, a number of layers have been printed on the platen 220, and it has been lowered with each layer or layers to allow the printing of the next layer on a previously printed layer. The boundary 210 constrains the part and support material against lateral deformation during printing.

A build platform such as build platform 168 may include more than one platen such as platen 220, allowing for the printing of multiple parts in layers, with the support material and part material being transferred to the transfer belt and transfused at the appropriate platen 220. Further, while the boundary 210 is shown as rectangular, a boundary of any shape may be used without departing from the scope of the disclosure. Further, the height 224 of the boundary 210 is shown as an example, and a boundary height 224 is limited only by physical characteristics of the build platform 168 and three-dimensional printer. For example, the recess 200 may be deeper or shallower than that shown, and may allow for an increased part height by moving further into the build platform, or in some embodiments, through the build platform to boundary walls extending beneath the build platform, to provide lateral constraint for a larger part. Further, the boundary 210 and/or platen 220 may be supplied with heating and/or cooling options to allow greater control of the temperature of the part.

Although the present disclosure has been described with reference to preferred embodiments, workers skilled in the art will recognize that changes may be made in form and detail without departing from the spirit and scope of the disclosure.

What is claimed is:

1. A method of printing a part in an electrophotography-based additive manufacturing system, comprising:
   printing a support structure for the part;
   printing the part on the support structure; and
   providing a boundary surrounding the support structure and the part, the boundary of sufficient strength to resist deformation of the support structure during printing of a layer of the part;
   wherein providing the boundary comprises printing the boundary; and
   wherein the boundary is printed with part material.

2. The method of claim 1, wherein the support structure is soluble in aqueous solution.

3. The method of claim 1, wherein the boundary is printed with a material different than the support structure and the part.

4. The method of claim 1, wherein the boundary is printed with a material combination of soluble support material and part material.

5. The method of claim 1, and further comprising, after building the part:
   restraining the part and a build sheet on which the part is built; and
   machining the boundary material from the part.

6. The method of claim 5, wherein restraining the part and the build sheet comprises magnetically chucking the part and the build sheet with a magnetic chuck.

7. The method of claim 1, wherein printing comprises:
   developing layers of the support structure, the boundary, and the part from charged material with support, boundary, and part electrophotography engines;
   electrostatically attracting the developed layers from the electrophotography engines to a transfer medium;
   moving the attracted layers to the layer transfusion assembly with the transfer medium; and
   transfusing the moved layers to previously-printed layers of the support structure, under pressure at an elevated temperature, boundary, and part with the layer transfusion assembly.

8. The method of claim 1, wherein printing of the support structure, the boundary, and the part are performed with three separate electrophotography-based print engines.

9. The method of claim 1, wherein printing of the support structure is performed using a first electrophotography-based engine and printing of the part and boundary are performed using a second electrophotography-based engine.

10. The method of claim 7, wherein printing the part further comprises developing multiple layers of the part in reverse order for transfer to the transfer medium.

11. The method of claim 1, wherein providing the boundary comprises providing a boundary structure having walls surrounding a movable platen carried on a movable build platform, the movable platen movable within the boundary structure on the movable build platform.

12. The method of claim 1, wherein providing the boundary comprises providing a solid structure.

13. The method of claim 12, wherein providing the boundary comprises providing a boundary comprising partially part material and partially support material.

* * * * *